United States Patent
Kennedy et al.

(10) Patent No.: US 7,053,759 B2
(45) Date of Patent: May 30, 2006

(54) METHOD OF DETERMINING AN EQUIVALENT VALUE FOR A FAILED SENSOR IN A VEHICLE SEAT HAVING AN OCCUPANCY SENSING SYSTEM

(75) Inventors: Karl R. Kennedy, Fraser, MI (US); Shridhar Malayappan, West Bloomfield, MI (US); John F. Nathan, White Lake Township, MI (US); Christopher T. Ricard, Rochester, MI (US); Oliver J. Young, Grosse Pointe Farms, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/974,624

(22) Filed: Oct. 27, 2004

(65) Prior Publication Data

US 2005/0140358 A1    Jun. 30, 2005

Related U.S. Application Data (63) Continuation of application No. 10/748,504, filed on Dec. 30, 2003.

(51) Int. Cl.
*B60Q 1/00* (2006.01)
*B60K 28/04* (2006.01)
*G06E 3/00* (2006.01)

(52) U.S. Cl. .................... 340/438; 340/667; 200/85 A; 180/273; 706/20; 702/101; 702/129

(58) Field of Classification Search ................ 340/438; 200/85 A
See application file for complete search history.

(56) References Cited

U.S. PATENT DOCUMENTS

| 5,377,108 | A | 12/1994 | Nishio | 364/424.05 |
|---|---|---|---|---|
| 5,404,128 | A | 4/1995 | Ogino et al. | 340/425.5 |
| 5,413,378 | A | 5/1995 | Steffens, Jr. et al. | 280/735 |
| 5,474,327 | A | 12/1995 | Schousek | 280/735 |
| 5,482,314 | A | 1/1996 | Corrado et al. | 280/735 |
| 5,485,000 | A | 1/1996 | Schneider | 235/494 |
| 5,570,903 | A | 11/1996 | Meister et al. | 280/735 |
| 5,583,771 | A | 12/1996 | Lynch et al. | 364/424.045 |
| 5,594,222 | A | 1/1997 | Caldwell | 200/600 |
| 5,653,462 | A | 8/1997 | Breed et al. | 280/735 |
| 5,684,701 | A | 11/1997 | Breed | 364/424.055 |
| 5,694,320 | A | 12/1997 | Breed | 364/424.055 |
| 5,731,781 | A | 3/1998 | Reed | 342/135 |

(Continued)

FOREIGN PATENT DOCUMENTS

EP    0 689 967 A1    3/1996

(Continued)

*Primary Examiner*—Donnie L. Crosland
(74) *Attorney, Agent, or Firm*—Bill Panagos (57) ABSTRACT

A method of determining an equivalent output value for a failed sensor in a vehicle seat having an occupancy sensing system. The method includes the steps of sensing the output of each sensor in an array of sensors that detect a physical presence in the seat. If the output of the sensor falls below a predetermined value, exceeds a predetermined value, or remains fixed the sensor is classified as inoperative. The method then calculates an equivalent sensor output value for any sensor classified as inoperative and applies the sensor array output values for each operable sensor in the array and the calculated equivalent output value for any inoperative sensor to a neural net. Then, the applied sensor output values are recognizing as falling within one of a group of predetermined classification patterns that represent a physical presence in the seat defined by size, weight, and physical orientation.

18 Claims, 4 Drawing Sheets

U.S. PATENT DOCUMENTS

| | | | |
|---|---|---|---|
| 5,739,757 A | 4/1998 | Gioutsos | 340/667 |
| 5,748,473 A | 5/1998 | Breed et al. | 364/424.055 |
| 5,748,803 A | 5/1998 | Schielke | 382/275 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | 3/1999 | Fleming et al. | 340/436 |
| 5,890,085 A | 3/1999 | Corrado et al. | 701/47 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/49 |
| 6,020,812 A | 2/2000 | Thompson et al. | 340/438 |
| 6,026,340 A | 2/2000 | Corrado et al. | 701/47 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,641 A | 7/2000 | Mattarella et al. | 296/64 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,272,411 B1 | 8/2001 | Corrado et al. | 701/45 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B1 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B1 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,442,465 B1 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B1 | 1/2003 | Babala et al. | 439/248 |
| 6,532,408 B1 | 3/2003 | Breed | 701/45 |
| 6,605,877 B1 | 8/2003 | Patterson et al. | 307/10.1 |
| 6,609,054 B1 | 8/2003 | Wallace | 701/45 |
| 6,615,122 B1 | 9/2003 | Yamashita | 701/45 |
| 6,650,978 B1 | 11/2003 | Patterson et al. | 701/35 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/144 |
| 2003/0071479 A1 | 4/2003 | Schaller et al. | 296/144 |
| 2003/0090133 A1 | 5/2003 | Nathan et al. | 297/144 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al | 702/173 |
| 2003/0225493 A1 | 12/2003 | Patterson et al. | 701/45 |
| 2004/0080425 A1 | 4/2004 | Sullivan et al. | 340/667 |

FOREIGN PATENT DOCUMENTS

| | | |
|---|---|---|
| EP | 1 475 274 A1 | 11/2004 |
| WO | WO 98/41424 | 3/1997 |
| WO | WO 01/48571 A1 | 7/2001 |

METHOD OF DETERMINING AN EQUIVALENT VALUE FOR A FAILED SENSOR IN A VEHICLE SEAT HAVING AN OCCUPANCY SENSING SYSTEM

CROSS-REFERENCE TO RELATED APPLICATIONS

This application is a continuation-in-part of U.S. Ser. No. 10/748,504, entitled Method of Occupancy Classification in a Vehicle Seat filed Dec. 30, 2003.

BACKGROUND OF THE INVENTION

1. Field of the Invention

The present invention relates, generally to a method of determining an equivalent value for a failed sensor and, more specifically, to a method of determining an equivalent sensor output value for an inoperative sensor employed in an array within a vehicle seat having an occupancy sensing system.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It can be appreciated that these occupant sensing systems provide valuable data, allowing the vehicle safety systems to function more effectively to reduce injuries to vehicle occupants.

One necessary component of each of the known systems discussed above includes some means for sensing the presence of the vehicle occupant in the seat. One such means may include a sensor device supported within the lower seat cushion of the vehicle seat. For example, U.S. published patent application having U.S. Ser. No. 10/249,527 and Publication No. U.S. 2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

The sensors are arranged into a grid, or an array so that the sensors are collectively used to provide the raw input data as a depression or deflection pattern in the seat cushion. In this manner, systems of the type known in the related art take the data from the sensor array and process it, by a number of different means, in an attempt to determine the physical presence in the seat. A number of the prior art systems sense the deflection of portions of the vehicle seat and attempt to discern from the sensor array data a recognized pattern that corresponds to one of the specified occupant classifications.

To accomplish the pattern recognition, the best of these newer systems take the data derived from the sensed seat occupancy and process it through an artificial neural network. Artificial neural networks are more commonly referred to as neural networks, or simply, neural nets (NN).

In general terms, a NN is essentially an interconnected assembly of simple processing element units, or nodes. The processing ability of the network is stored in the inter-unit connection strengths, or weights, obtained by a process of adaptation to, or learning from, a set of training patterns. The NN may simply have an input and an output layer of units, or have an additional "hidden" layer or layers of units that internally direct the interconnection processes. The benefit to employing a NN approach is that, if properly trained, the NN will be able to generalize and infer the correct output responses from limited input data. Specifically in the case at hand, the NN based occupancy sensing systems determine that a physical presence is in a vehicle seat, recognize the type of physical presence by the sensor pattern it presents and pass this information to a restraint system control to determine if the pattern classification requires deployment or suppression of the airbag or other restraints.

In this regard, NNs applied to vehicle occupancy sensing systems, especially those that employ supervised learning such as discussed in the co-pending application U.S. Ser. No. 10/748,504, entitled Method of Occupancy Classification in a Vehicle Seat filed Dec. 30, 2003 have proven to be successful. However, from a physical standpoint, all occupancy sensing systems employing sensors that deflect or are moved in response to a physical presence in the seat fundamentally rely on receiving accurate and reliable data from the sensors to operate properly.

As mentioned above, various styles and types of sensors have been employed in occupancy sensing systems, with the Hall-effect sensor type being the most common. Regardless of the type of sensor employed, physical failure of at least one of the sensors in the array during the life of the seat is, at the least, a possibility. Even with robust sensors constructed to withstand millions of deflections or compressions, other factors such as foreign object interference, loss of connection to the array, or physical damage to the seat are possible interfering or damaging effects that will prevent valid sensor data from reaching the NN.

Prior art occupancy sensing systems rely on the fact that vehicle seat employs a sensor array for occupant classification and that the sensors function as a cohesive group rather than as independent entities. In other words, conventional occupancy classification systems trust that since the seat foam and seat covering cause the sensors to generally deflect as a group that the output of the array as a group continues to present valid data even after the failure of one of the sensors. However, even though there is some cooperative influence upon the array of sensors as a whole, the loss of even one sensor can cause erroneous occupancy classifications to occur. This is particularly true in light of the ever-tightening Federal Safety Standards that continue to require more accurate discernment between the occupancy classification groups. Of particular concern, if an occupancy classification is erroneously determined by relying on the sensor array that has a failed sensor, serious problems may arise by allowing for improper suppression or deployment of the restraint systems with respect to the actual occupant. Furthermore, current occupancy sensing and classification systems are unable to identify a sensor that is not functioning properly and therefore lack the means to compensate for the failed sensor. Thus, not only will the failed sensor continue to cause erroneous occupancy classifications to be determined for each respective occupant, but the erroneous determinations will go unnoticed allowing an improper deployment action in the restraint system to ultimately occur.

Accordingly, there remains a need in the art for a method of determining when a sensor in the array of an occupancy sensing system has failed. Furthermore, there remains a need in the art for a method that can determined an equivalent output value for the failed sensor of an occupancy sensing system and use that value as a replacement for the failed sensor until the occupancy sensing system can be repaired.

SUMMARY OF THE INVENTION

The disadvantages of the related art are overcome by the method of the present invention that determines an equivalent output value for a failed sensor in a vehicle seat having an occupancy sensing system. The method includes the steps of sensing the output of each sensor in an array of sensors that detect a physical presence in the seat. If the output of the sensor falls below a predetermined value, exceeds a predetermined value, or remains fixed, the sensor is classified as inoperative. The method then calculates an equivalent sensor output value for any sensor classified as inoperative and applies the sensor array output values for each operable sensor in the array and the calculated equivalent output value for any inoperative sensor to a neural net. Then, the applied sensor output values are recognizing as falling within one of a group of predetermined classification patterns that represent a physical presence in the seat defined by size, weight, and physical orientation.

Thus, the present invention overcomes the limitations of the current occupancy sensing and classification systems that employ a group of sensors in an array by identifying when a sensor has failed, providing an equivalent sensor output value for the failed sensor, and notifying the operator that such a failure has occurred. In this manner, after notifying the vehicle operator of the failed sensor, the present invention allows the occupancy sensing system of the particular seat to continue to provide valid data to the restraint system by providing an equivalent sensor output value for the failed sensor until the seat can be repaired. Furthermore, the present invention provides equivalent sensor output values for a failed sensor that are based on dynamic output values from neighboring sensors to achieve accurate and reliable results.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
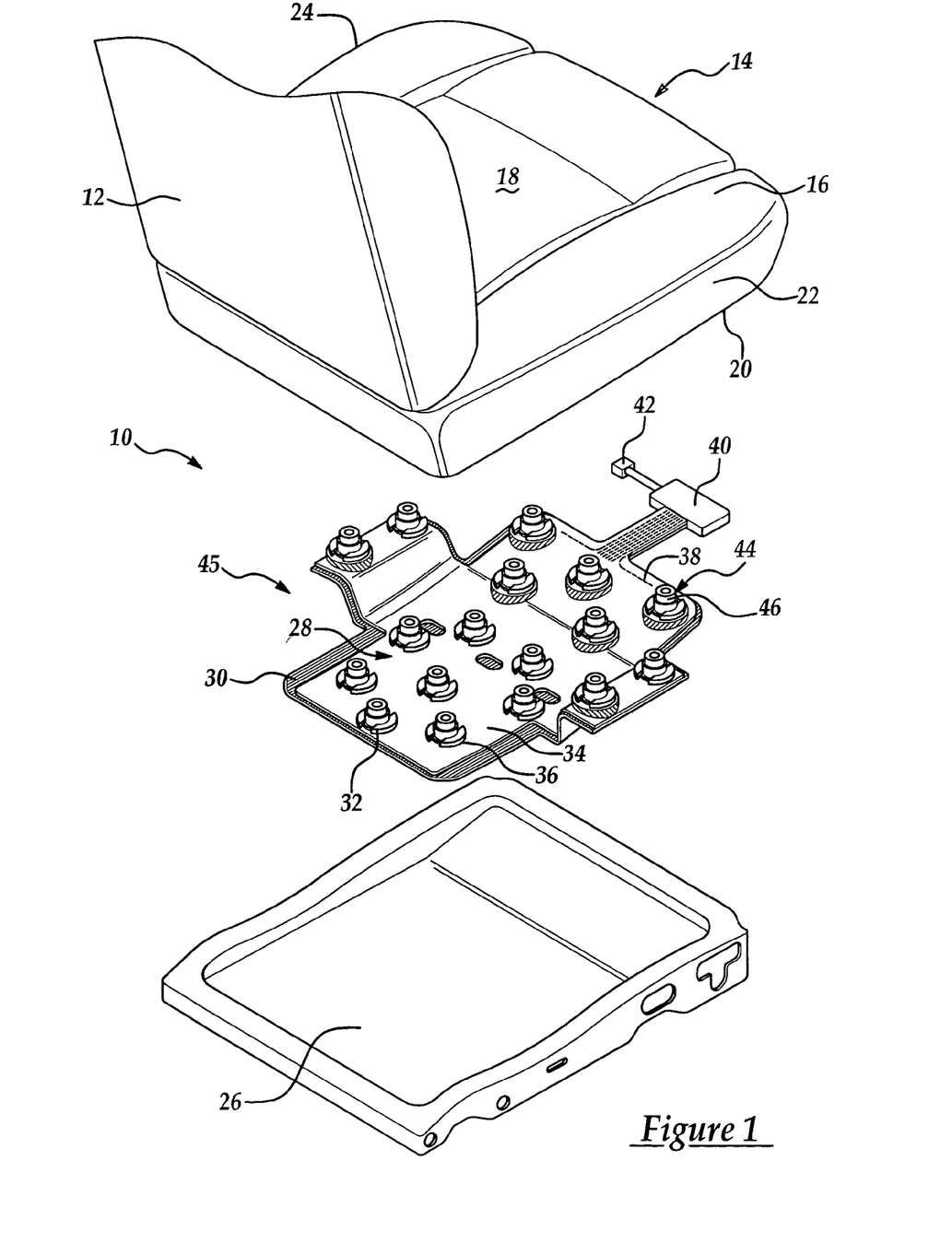
FIG. 1 is an exploded view of a vehicle seat having a sensor array used for occupancy classification of the type that may be employed with the method of the present invention to predict an empty seat condition.

Referring now to the drawings, where like numerals are used to designate like structure throughout the figures, an exploded view of one example of a vehicle seat assembly having an occupancy sensing system that may be employed with the method of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, the size and weight classification of the occupant, or whether the occupant is sitting in a certain position.

The occupant sensing system 28 includes a circuit carrier tray, generally indicated at 30, that is supported by the seat pan 26. The circuit carrier tray 30 includes a plurality of resilient attachment tabs 32 extending upward toward the lower surface 20 of the lower seat cushion 16. Each attachment tab 32 is shaped like a partial ring that extends upward from the tray 30. In the preferred embodiment illustrated in FIG. 1, the attachment tabs 32 are arranged into mirror image pairs spaced intermittently about the tray 30. The tray 30 supports components of the vehicle occupant sensing system 28 as will be described in greater detail below.

The occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The occupant sensing system 28 also includes an electric circuit 38, which is supported by the circuit carrier 34. Specifically, the circuit carrier 34 is made of a thin nonconductive and corrosion-resistant material, and it encapsulates known electrical components that form the electric circuit 38. For instance, in one embodiment, a flexible printed circuit forms the circuit carrier 34 and electric circuit 38. The circuit 38 is electrically connected to a controller schematically illustrated at 40. The electric circuit 38 carries electric signals generated by the vehicle occupant sensing system 28 to the controller 40. The controller 40 is electrically attached to a supplemental restraint system (SRS), schematically illustrated at 42. The restraint system 42 can be of many types, such as an air bag system, and the controller 40 controls the restraint system 42 based on the signals delivered by the electric circuit 38. Although an airbag restraint system is discussed here, one having ordinary skill in the art will recognize that the type of restraint system 42 connected to the controller 40 does not limit the scope of the method of the present invention.

The occupant sensing system 28 shown in this example also includes a plurality of sensor assemblies generally indicated at 44 that are supported by the tray 30, below the lower surface 20 of the seat cushion 16. This plurality of sensor assemblies 44 collectively define a sensor array that is generally indicated at 45. As will be discussed in greater detail below, the particular sensor assemblies 44 shown herein have a relatively low profile and can collapse in a more compact manner than similar sensor assemblies of the prior art. Advantageously, these low profile sensor assemblies 44 allow an occupant to sit more comfortably upon the vehicle seat 10.

A sensor, generally indicated at 46, is operatively fixed relative to each of the low profile sensor assemblies 32. The sensor 46 is in electrical communication with the electric circuit 38. One example of a low profile sensor assembly that may be employed with the method of the present invention is shown in greater detail in FIGS. 2 and 3. The low profile sensor assembly 44 generally includes a housing 48, having a base 50, an upper slide member 52, an intermediate guide member 54, and a base guide 58. The intermediate guide member 54 is disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50.

Figure 2:
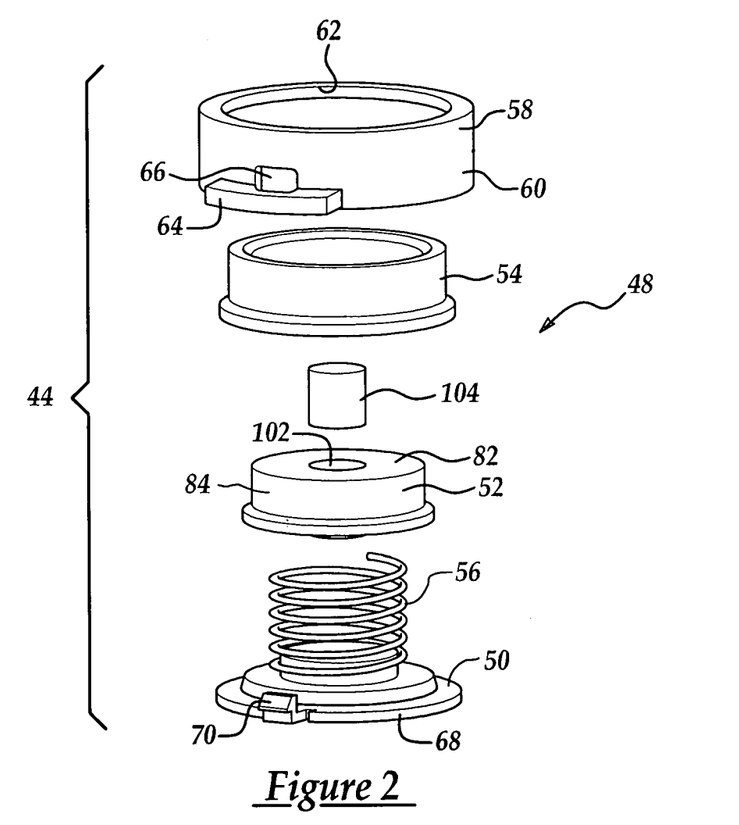
FIG. 2 is an exploded view of a sensor from the sensor array of FIG. 1.
Figure 3:
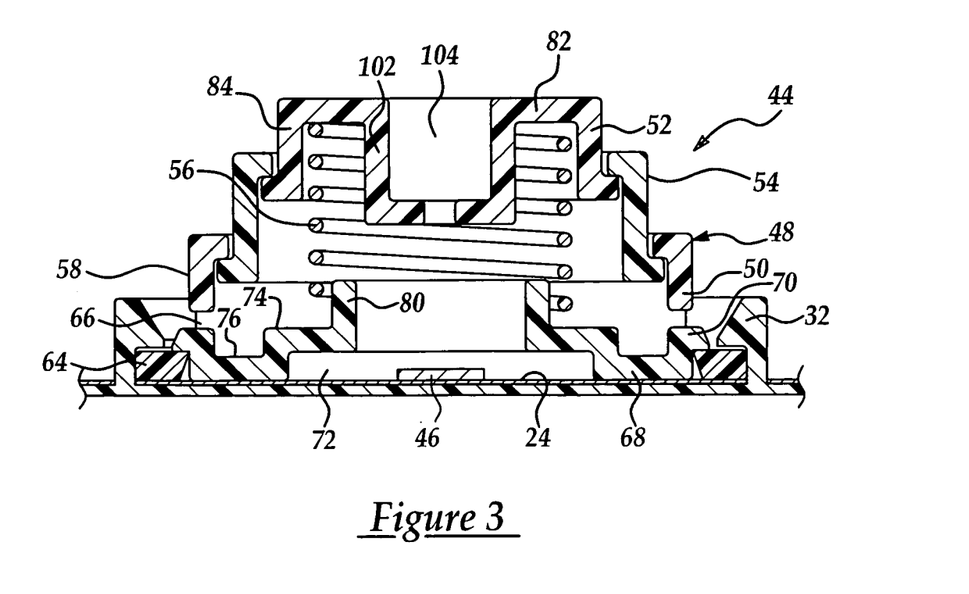
FIG. 3 is a cross-sectional view of the sensor of FIG. 2.

The base guide 58 is shaped like a hollow tube so as to define a wall 60 with a bore 62 extending axially there through to allow for axial movement of the intermediate guide member 54. The base 50 also includes a retainer portion 68, which is substantially disc-shaped and is attached to one terminal end of the base guide 58. Two resilient tabs 70 extend radially and upward from an outer circumferential edge of the retainer portion 68. The tabs 70 are spaced 180° apart from each other. To connect the retainer portion 68 and the base guide 58, the retainer 68 moves axially into the bore 62 of the base guide 58 such that the tabs 70 of the retainer 68 snap into the apertures 66 of the base guide 58.

The upper slide member 52 includes an upper disc portion 82 and a support wall 84 extending axially downward from the outer circumference of the upper disc portion 82. The support wall 84 has a smaller diameter than the diameter of the intermediate guide member 54 such that the upper slide member 52 can move axially through the intermediate guide member 54. The biasing member 56 is disposed between the inner platform 78 of the base 50 and the upper disc portion 82 of the upper slide member 52. As shown in FIG. 3, the base 50 can be attached to the annular attachment tabs 32 that extend upwardly from the tray 30. Specifically, the hold-down flanges 64 of the base guide 58 can be positioned under the annular attachment tabs 32 of the tray 30 such that the annular attachment tabs 32 retain the hold-down flanges 64. To attach the base 50 to the tray 30, the bottom surface of the base 50 is positioned on the tray 30 such that the hold-down flanges 64 and the annular attachment tabs 32 are not aligned. Then, the base 50 is rotated about its axis until the hold-down flanges 64 move completely under the annular attachment tabs 32.

An annular void 72 is formed near the axial center of the base 50. As shown in FIG. 3, the sensor 46 is a Hall effect sensor attached to the circuit carrier 34 between each pair of tabs 32 of the tray 30. The upper disc portion 82 of the upper slide member 52 includes a retainer portion 102 that accepts and retains an emitter 104, such as a magnet. The magnet thereby moves in axial relationship to the sensor 46 that is disposed upon and in electrical communication with the electric circuit 38. Thus, the weight of an occupant will deform the seat cushion 16 such that the lower surface 20 of the lower seat cushion 16 pushes the upper slide member 52 toward the base 50. As the upper slide member 52 moves, the sensor 46 detects an increase in magnetic flux density generated by the approaching emitter 104. In this way, the sensor 46 is operable to detect movement of the upper slide member 52 toward and away from the base 50. In turn, the sensor 46 generates a responsive signal indicative of the increase in flux density, and the controller 40 controls the restraint system 42 based on these signals. The sensor assembly 44 is described in greater detail in a co-pending application Ser. No. 10/748,536, entitled "Vehicle Occupant Sensing System Having a Low Profile Sensor Assembly," which is hereby incorporated in its entirety by reference. The electrical attachment between the sensor 46 and the circuit carrier 34 can be accomplished in the manner described in a co-pending application Ser. No. 10/748,514, entitled "Vehicle Occupant Sensing System and Method of Electrically Attaching a Sensor to an Electrical Circuit," which is hereby incorporated in its entirety by reference.

In this manner, the sensor array assembly 45, through the combined output of the sensors 46 forms a portion of a vehicle seat occupancy sensing system that is associated with the supplemental restrain system (SRS) 42. The sensor array 45 is utilized to provide data to a neural net, which classifies the pattern generated by the sensor array 45 to allow the SRS control system to activate or suppress the deployment of the airbags. More specifically, when a physical presence occupies the vehicle seat, the collective sensor outputs of the sensors 46 in the sensor array 45 produce a particular pattern that the NN recognizes as belonging to a certain group of patterns (i.e. a cluster or classification). If the pattern is one that falls into a classification that it has been predetermined that it is desirable to deploy the airbag in the event of an impact, the SRS control system will be prepared to do so. If the pattern is one that falls into a classification that it has been predetermined that it is not desirable to deploy the airbag in the event of an impact, the SRS control system will take steps to suppress the deployment. Furthermore, the classification of the recognized pattern also provides the SRS control system with the capability to control the rate and percentage of airbag deployment if the SRS system is so designed.

As noted above, if even one sensor in the array fails or becomes otherwise inoperative, the functional integrity of conventional occupancy sensing systems will be compromised. Additionally, conventional occupancy sensing systems generally do not provide warnings to the vehicle operator that this portion of the overall safety restraint system has failed. Even if this feature is provided for, the conventional occupancy sensing system has no means to continue to adequately function until repairs can be undertaken. Thus, while an indication of system failure may be provided, continued use of the vehicle will put the occupant in the seat having the failed sensing system at risk. To overcome this problem, the present invention provides a method that determines an equivalent output value for the failed sensor in a vehicle seat having an occupancy sensing system. The equivalent output value replaces the non-functional output of the failed sensor and is used to continue to determine the occupancy classification for the occupant of the seat.

Figures 4, 6:
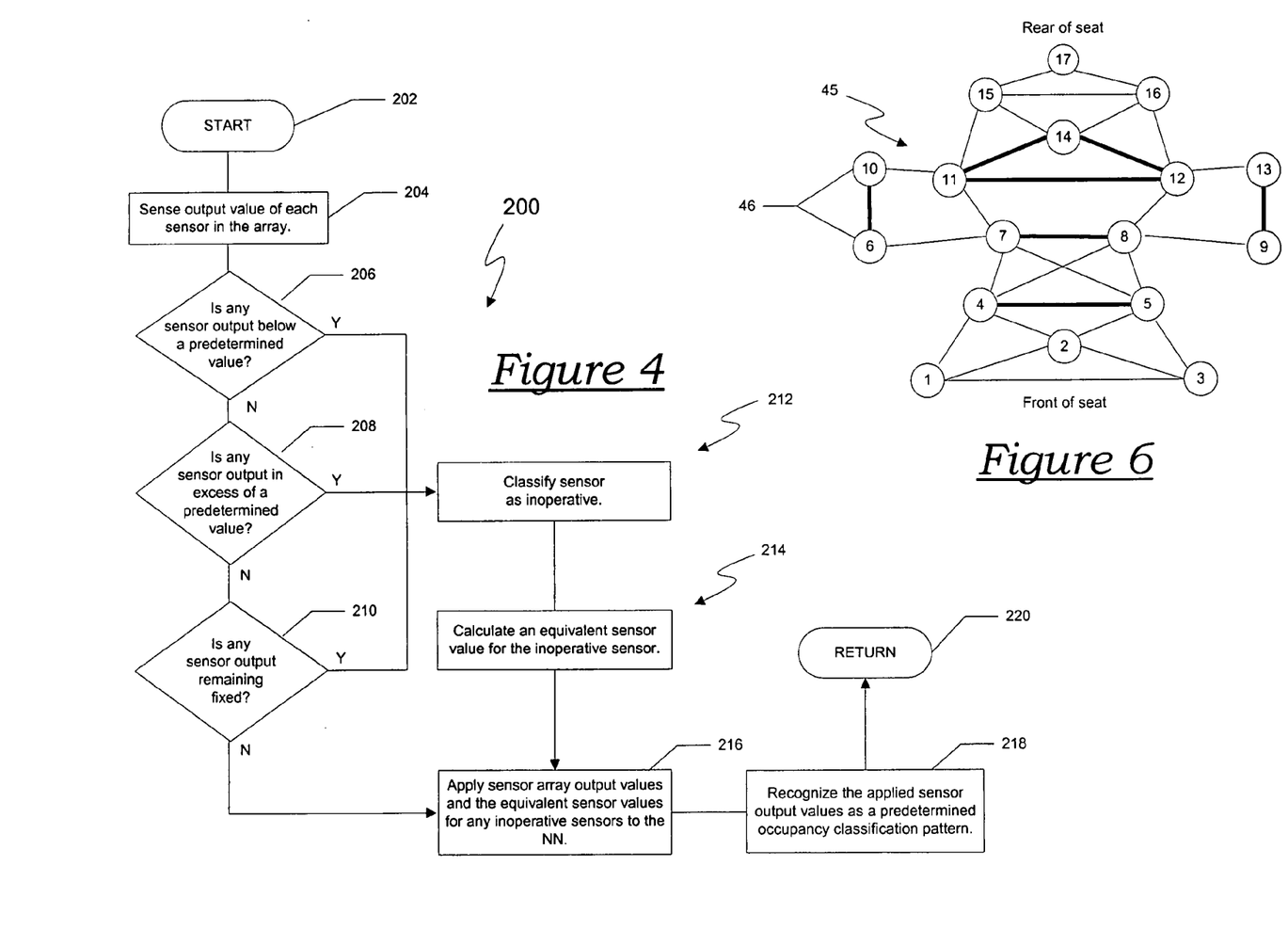
FIG. 4 is a general block diagram flow chart of the method steps of the present invention.
FIG. 6 is a schematic view of a sensor array of the type illustrated in FIG. 1 that may be employed by the present invention for recognizing and classifying the occupancy in a vehicle seat.

The method of the present invention, as generally indicated at 200 in FIG. 4, determines an equivalent output value for a failed sensor in a vehicle seat having an occupancy sensing system. The method begins at the start entry block 202, which is indicative of the entry into this series of method steps from some higher level control. It should be appreciated that the method steps of the present invention may be a subroutine of the higher level control of the restraint system such that methods steps are repeated during each operative pass through the monitoring of the positioning of the seat sensors of the array, or it may be a separately running control scheme to monitor the sensor outputs.

In either case, process block 204 senses the output of each sensor in the array that are employed to detect a physical presence in the seat. Once all the sensor outputs are sensed, the next three decision blocks will verify the output level of all the sensors to determine if any sensor output can be characterized as one from a group including a sensor output that falls below a predetermined value, exceeds a predetermined value, and remains fixed. More specifically, decision block 206 will determine if any sensor output falls below a predetermined value. It should be appreciated that depending upon the type of sensor employed, the manner of output may be of differing types (i.e., voltage, resistance, etc.). In the preferred embodiment, the sensor output is measurable as an analog voltage level having a minimum predetermined threshold of level 2.6 VDC. If all the sensors in the array meet this threshold, the "No" path is followed to decision block 208, which will determine if the output of any of the sensors exceeds a predetermined value. In the preferred embodiment, the predetermined maximum for the output voltage of the sensors is 4.9 VDC.

If this maximum sensor output voltage is not exceeded by any of the sensors in the array, the "No" path is followed to decision block 210, which will determine if the output of all the sensors is dynamically changing and not remaining at a fixed value. It should be appreciated that decision block 210 makes this determination as a function of a predetermined time or number of passes through the method steps. Normally, even if the occupant of the seat sits still with no changes in their relative seating positioning, each sensor will still indicate some level of change that relates to the movement of the vehicle and the responsive cushioning movement of the seat with respect to the occupant. However, in certain conditions where the vehicle is at rest and the occupant remains still it would be possible to improperly sense fixed sensor values in decision block 210 if some manner of qualifying reference relating to time or number of repeat passes (i.e. sensor samples) through the method steps is not employed. In the preferred embodiment, decision block 210 determines if any sensor output is fixed by looking at the sensor outputs over five consecutive sensor samples. A sensor is determined to be fixed if the particular sensor output does not vary over the five samples more than 0.01 VDC.

If none of the sensors provide a fixed output value, the "No" path is followed to process block 216, which will apply the sensed output values to the NN for further pattern recognition at process block 218, as discussed below. If any sensor output value is below the predetermined threshold in decision block 206, or exceeds the predetermined maximum at decision block 208, or remains fixed at decision block 210, the respective "Yes" path is taken to the next process block generally indicated at 212. Process block 212 classifies the particular sensor that is either below or above the predetermined values or is fixed, as inoperative. Then, as generally indicated at 214, the next process block calculates an equivalent sensor value for the inoperative sensor. Process block 216 will then apply the equivalent sensor value along with the remainder of the sensor outputs from the array to the NN. The applied sensor output values are then recognized at process block 218 as falling within one of a group of predetermined classification patterns that represent a physical presence in the seat defined by size, weight, and physical orientation. The method steps then complete at the return block 220, which provides the ability for the method steps be repeated as determined by the higher-level control.

Figure 5:
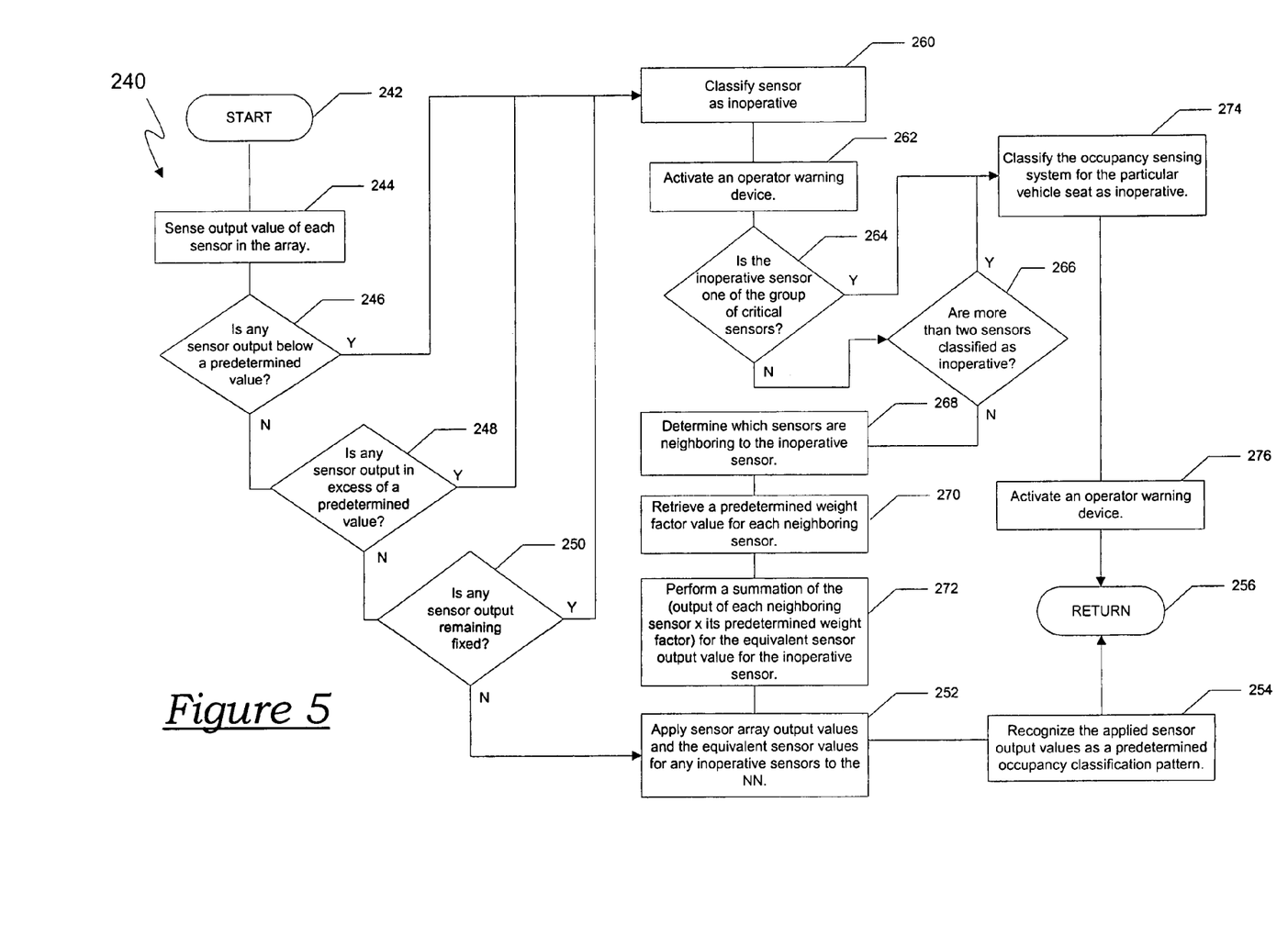
FIG. 5 is a detailed block diagram flow chart of the method steps of the present invention.

More specifically, and by way of non-limiting example, the method steps indicated in FIG. 4 may include additional steps such as those depicted in detail in FIG. 5. In this example of the method of the present invention, as generally indicated at 240 in FIG. 5, once initialized at the start block 242, the method steps move to process block 244, which senses the output of each sensor in the array that are employed to detect a physical presence in the seat. Once all the sensor outputs are sensed, the next three decision blocks will verify the output level of all the sensors to determine if any sensor output can be characterized as one from a group including a sensor output that falls below a predetermined value, exceeds a predetermined value, and remains fixed. More specifically, decision block 246 will verify the output level of all the sensors to determine if any sensor output falls below a predetermined value.

As mentioned above with reference to FIG. 4, in the preferred embodiment, the sensor output is measurable as an analog voltage level having a minimum predetermined threshold of level 2.6 VDC. If all the sensors in the array meet this threshold, the "No" path is followed to decision block 248, which will determine if the output of any of the sensors exceeds a predetermined value. As also mentioned above, in the preferred embodiment, the predetermined maximum for the output voltage of the sensors is 4.9 VDC. If this maximum is not exceeded by any of the sensors in the array, the "No" path is followed to decision block 250, which will determine if the output of all the sensors is dynamically changing and not remaining at a fixed value.

As mentioned above with regard to decision block 210 of FIG. 4, decision block 250 in FIG. 5 makes this determination as a function of a predetermined time or number of repeat passes (i.e. sensor samples) through the method steps to avoid falsely sensing a fixed sensor during certain operating conditions. In the preferred embodiment, decision block 250 determines if any sensor output is fixed by looking at the sensor outputs over five consecutive sensor samples. A sensor is determined to be fixed if the particular sensor output does not vary over the five samples more than 0.01 VDC. If none of the sensors provide a fixed output value, the "No" path is followed to process block 252, which will apply the sensed output values to the NN for further pattern recognition at process block 254.

If any sensor output value is below the predetermined threshold in decision block 246, or exceeds the predetermined maximum at decision block 248, or remains fixed at decision block 250, the respective "Yes" path is taken to the next process block 260. Process block 260 classifies the particular sensor that is either below or above the predetermined values or is fixed, as inoperative. Process block 262 then activates an operator warning device to indicate to the operator that a sensor in the occupancy sensing is inoperative. It should be appreciated that this indication may take on a variety of forms within the vehicle and may be a separate indicator light or part of an integrated vehicle warning or indicator panel, for example. It should be appreciated that the indicator is one in which the operator is warned to have immediate service provided for the seat even though it is still functional.

The method steps continue to decision block 264, which determines when a sensor has been classified as inoperative, if the inoperative sensor is one that falls into a predetermined critical group of sensors. More specifically, within the sensor array, depending upon the structure of the particular seat, certain sensors may be designated as "critical" to the proper operation of the occupancy sensing system. In other words, in some seat configurations, critical sensors exist within the array that must be fully operational to achieve the proper operation of the occupancy sensing system. In these seat configurations, the actual output of the critical sensors must be provided to the NN to properly classify the presence in the seat. This is due to the fact that the distinction between several of the occupancy classifications, as defined by federal safety guidelines, is quite small. Thus, for the NN to achieve accurate recognition of the output of the sensor array so that it can correctly identify the presence in the seat over a wide range of dynamic conditions it is necessary that the "critical" sensors be fully operational. The number of critical sensors will vary depending upon the actual structure of the seat and are generally few in number. Additionally, the sensor array may be configured to minimize and possibly eliminate critical sensors within the array. Thus, it should be appreciated that if no critical sensors are in the sensor array, decision block 264 is not needed and the method steps will immediately proceed from process block 262 to 266. However, if critical sensors are employed in the structure of the array, the present invention accounts for them at decision block 264. If the inoperative sensor is also a critical sensor, the "Yes" path is followed to process block 274, which classifies the occupancy sensing system for the particular seat as inoperative. Then, process block 276 will activate an operator warning device to indicate to the operator that the occupancy sensing for the seat in question is inoperative. It should be appreciated that this indication may take on a variety of forms within the vehicle and may be a separate indicator light or part of an integrated vehicle warning or indicator panel, for example. It should be further appreciated that the indicator activated in process block 276 may be one in which the operator is warned to have immediate service provided for the seat as its functionally may be severely limited.

If the inoperative sensor is not a critical sensor, the "No" path is taken to decision block 266 in which it is determined if more than two sensors are now classified as inoperative. If more than two sensors have been classified as inoperative, the "Yes" path is taken to process blocks 274 and 276 as described above. In this regard, at the point at which three sensors become inoperative, the array in general may lack the integrity to accuracy provide reliable sensor data to the NN and it is most likely that other serious problems are occurring within the array such that immediate servicing is necessary.

If only one or two sensors are classified as inoperative at decision block 266, the "No" path is taken to process block 268, which determines which sensors are neighboring to the sensor most recently classified as inoperative. It should be appreciated that this step is preparatory to determining an equivalent sensor output value for the inoperative sensor, as the equivalent output value will be derived from the remaining operational sensors. This is possible due to the interrelation of each sensor in the array to the other sensors. More specifically, as previously mentioned, the sensors do not operate entirely independent of each other. The seat foam and the covering materials on the seat "A" surface are deflected somewhat homogeneously by a presence in the seat so that each sensor will have some level of deflection for any given form placed in the seat. Thus, the deflection, and thereby the output of any one sensor in the array shows a correlation with the other sensors in its immediate neighborhood. In other words, each sensor has a certain amount of cooperative deflection with respect to the sensors that neighbor it in the array. In addition to determining the sensors that neighbor the inoperative sensor, process block 268 also stores the outputs of the neighboring sensors for further calculations.

The method steps then continue to process block 270, which retrieves a predetermined weight factor for each of the neighboring sensors in relation to the inoperative sensor from a stored database. Each predetermined weight factor value for a neighboring sensor represents the operative correlation between the inoperative sensor and that particular neighboring sensor. For example, as schematically shown in FIG. 6, a sensor array 45 of the type illustrated in FIG. 1 is comprised of seventeen (17) sensors 46. The straight lines illustrate the relative correlation that exists between neighboring sensors. The heavy lines are indicative of distinctly strong neighboring correlations. It should be appreciated that the magnitude of the correlation between the sensors will vary depending upon the design of the seat with regard to placement of the sensors, distance between the sensors, the cushioning materials, the seat covering materials, and other physical parameters. Due to these various influences upon the sensors, the correlation between the sensors is tested empirically and a correlation map is derived that has assigned values of corollary influence between the sensors. It should be appreciated that various mathematical processes may be employed to either derive the correlations or provide greater accuracy in determining the magnitude of correlation between the sensors. For example, linear estimation utilizing total squared error derivations with autocorrelation may be used to refine the sensor correlations to each other. Ultimately, the values of corollary influence between the sensors are expressed as the weight factor values or coefficients. Once they are determined for the particular seat structure they remain unchanged and are stored in the ECU or other control device for later retrieval.

Once process block 270 retrieves the weight factors values for the sensors that neighbor the inoperative sensor, process block 272 performs a mathematical summation to derive the equivalent sensor output for the inoperative sensor. Process block 252 will then apply the equivalent sensor value along with the remainder of the valid sensor outputs from the array to the NN. The applied sensor output values are then recognized at process block 254 by the NN as falling within one of a group of predetermined classification patterns that represent a physical presence in the seat defined by size, weight, and physical orientation. The method steps then complete at the return block 256, which provides the ability for the method steps be repeated as determined by the higher-level control.

More specifically, to determine the equivalent sensor output value for the inoperative sensor at process block 272, a summation is performed of the output of each neighboring sensor multiplied the predetermined weight factor value for that particular neighboring sensor (with respect to the inoperative sensor) to yield the equivalent sensor output value. In the preferred embodiment this is mathematically represented as:

$$\hat{X}_{kn} = \sum_{\substack{i=1 \\ i \neq k}}^{M} a_{ik} X_{in} \quad (1)$$

where $\hat{X}_{kn}$ is the estimate of the n-th sample of the k-th (inoperative) sensor; i is the cardinal number of sensors neighboring k with M the maximum; $a_{ik}$ (i=1, 2 ... M) are the weight factors associated with the sensors in the neighborhood of the k-th sensor; and $X_{in}$ (i=1, 2 ... M and i≠k) are the outputs of sensors in the neighborhood of the k-th sensor.

Equation (1) states that the k-th sensor output may be estimated as the weighted average of the output of the M number of neighboring sensors (minus the inoperative sensor, i.e. (M−1)) that are in the neighborhood of the k-th sensor. For example, assume that sensor 2 of the seventeen sensor array shown in FIG. 6 has failed and has been classified inoperative. As shown in FIG. 6, sensors 1, 3, 4, and 5 provide a neighboring correlation to sensor 2. To derive an equivalent sensor output value to replace the output of inoperative sensor 2, equation (1) is employed. In this case, k=2, i is set to 1, M is set to 5, and the equivalent sensor output value is given by:

$$\hat{X}_{2n} = \sum_{\substack{i=1 \\ i \neq 2}}^{5} a_{i2} X_{in} = a_{12} X_{1n} + a_{32} X_{3n} + a_{14} X_{1n} + a_{52} X_{5n} \quad (2)$$

Thus, the output of inoperative sensor 2 is replaced by an equivalent sensor output value, which is a weighted average (linear combination) of the outputs of sensors 1, 3, 4, and 5. It should be appreciated that this process is dynamic and will mathematically change for each pass (n numbered sample) through the method steps based on the changes in the outputs of the neighboring sensors. In this manner, the equivalent sensor output value dynamically responds to the changes in the output values of the neighboring sensors thereby ensuring a high level of accuracy and reliability in the equivalent sensor output value.

Thus, the present invention overcomes the limitations of the current occupancy sensing and classification systems that employ a group of sensors in an array by identifying when a sensor has failed, providing an equivalent sensor output value for the failed sensor, and notifying the operator that such a failure has occurred. In this manner, after notifying the vehicle operator of the failed sensor, the present invention allows the occupancy sensing system of the particular seat to continue to provide valid data to the restraint system by providing an equivalent sensor output value for the failed sensor until the seat can be repaired. Furthermore, the present invention provides equivalent sensor output values for a failed sensor that are based on dynamic output values from neighboring sensors to achieve accurate and reliable results.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of determining an equivalent output value for a failed sensor having an output in a vehicle seat having a occupancy sensing system, said method including the steps of:
    sensing the output of each sensor in an array of sensors that detect a physical presence in the seat;
    classifying a sensor as inoperative when the output of the sensor is characterized as one from a group including a sensor output that falls below a predetermined value, exceeds a predetermined value, and remains fixed;
    calculating an equivalent sensor output value for any sensor classified as inoperative;
    applying the sensor array output values for each operable sensor in the array and the calculated equivalent output value for any inoperative sensor to a neural net; and
    recognizing the applied sensor output values as one of a group of predetermined classification patterns that represent a physical presence in the seat defined by size, weight, and physical orientation.

2. A method as set forth in claim 1, wherein the step of calculating an equivalent sensor output value for any sensor classified as inoperative further includes the steps of:
    determining which sensors are neighboring to the inoperative sensor within the array;
    sensing the output of each neighboring sensor;
    retrieving a predetermined weight factor value for each neighboring sensor that represents the operative correlation between the inoperative sensor and the particular neighboring sensor from a stored database; and
    performing a mathematical summation of the output of each neighboring sensor multiplied by the predetermined weight factor value for that particular neighboring sensor to yield the equivalent sensor output value for the inoperative sensor.

3. A method as set forth in claim 1, wherein the step of recognizing the applied sensor output values as one of a group of predetermined classification patterns further includes the step of continuously reinitiating the method steps to continuously recognize the classification pattern.

4. A method as set forth in claim 3, wherein the step of continuously reinitiating the method steps further includes the steps of:
    determining if more than two sensors have been classified as inoperative;
    classifying the occupancy sensing system for the particular vehicle seat as inoperative when more than two sensors have been classified as inoperative; and
    activating an operator warning device indicating the inoperative status of the occupancy sensing system for the particular vehicle seat.

5. A method as set forth in claim 1, wherein said step of classifying a sensor as inoperative when the output of the sensor falls below a predetermined value further includes the steps of:
    determining if the sensor is one that falls into a predetermined group of critical sensors such that an equivalent sensor output will not be calculated;
    classifying the occupancy sensing system for the particular vehicle seat as inoperative when more than two sensors have been classified as inoperative; and
    activating an operator warning device indicating the inoperative status of the occupancy sensing system for the particular vehicle seat.

6. A method as set forth in claim 1, wherein said step of classifying a sensor as inoperative when the output of the sensor exceeds a predetermined value further includes the steps of:
    determining if the sensor is one that falls into a predetermined group of critical sensors such that an equivalent sensor output will not be calculated;
    classifying the occupancy sensing system for the particular vehicle seat as inoperative when more than two sensors have been classified as inoperative; and
    activating an operator warning device indicating the inoperative status of the occupancy sensing system for the particular vehicle seat.

7. A method as set forth in claim 1, wherein said step of classifying a sensor as inoperative when the output of the sensor remains fixed further includes the steps of:
    determining if the sensor is one that falls into a predetermined group of critical sensors such that an equivalent sensor output will not be calculated;
    classifying the occupancy sensing system for the particular vehicle seat as inoperative when more than two sensors have been classified as inoperative; and
    activating an operator warning device indicating the inoperative status of the occupancy sensing system for the particular vehicle seat.

8. A method of determining an equivalent output value for a failed sensor having an output in a vehicle seat having a occupancy sensing system, said method including the steps of:
    sensing the output of each sensor in an array of sensors that detect a physical presence in the seat;
    classifying a sensor as inoperative when the output of the sensor is characterized as one from a group including a sensor output that falls below a predetermined value, exceeds a predetermined value, and remains fixed;
    when a sensor has been classified as inoperative, determining if the inoperative sensor is one that falls into a predetermined critical group of sensors such that an equivalent sensor output will not be calculated;
    determining which sensors are neighboring to the inoperative sensor within the array when a sensor is classified as inoperative and is not in the predetermined critical group;
    sensing the output of each neighboring sensor;
    retrieving a predetermined weight factor value for each neighboring sensor that represents the operative correlation between the inoperative sensor and the particular neighboring sensor from a stored database;
    performing a mathematical summation of the output of each neighboring sensor multiplied by the predetermined weight factor value for that particular neighboring sensor to yield the equivalent sensor output value for the inoperative sensor;
    applying the output values for each operable sensor in the array and the calculated equivalent output value for any inoperative sensor to a neural net; and
    recognizing the output values as one of a group of predetermined classification patterns that represent a physical presence in the seat defined by size, weight, and physical orientation.

9. A method as set forth in claim 8, wherein the step of recognizing the sensor array output further includes the step of continuously reinitiating the method steps to continuously recognize the classification pattern.

10. A method as set forth in claim 9, wherein the step of continuously reinitiating the method steps further includes the steps of:
  determining if more than two sensors have been classified as inoperative;
  classifying the occupancy sensing system for the particular vehicle seat as inoperative when more than two sensors have been classified as inoperative; and
  activating an operator warning device indicating the inoperative status of the occupancy sensing system for the particular vehicle seat.

11. A method as set forth in claim 8, wherein said step of classifying a sensor as inoperative when the output of the sensor falls below a predetermined value further includes the steps of:
  classifying the occupancy sensing system for the particular vehicle seat as inoperative when more than two sensors have been classified as inoperative; and
  activating an operator warning device indicating the inoperative status of the occupancy sensing system for the particular vehicle seat.

12. A method as set forth in claim 8, wherein said step of classifying a sensor as inoperative when the output of the sensor exceeds a predetermined value further includes the steps of:
  classifying the occupancy sensing system for the particular vehicle seat as inoperative when more than two sensors have been classified as inoperative; and
  activating an operator warning device indicating the inoperative status of the occupancy sensing system for the particular vehicle seat.

13. A method as set forth in claim 8, wherein said step of classifying a sensor as inoperative when the output of the sensor remains fixed further includes the steps of:
  classifying the occupancy sensing system for the particular vehicle seat as inoperative when more than two sensors have been classified as inoperative; and
  activating an operator warning device indicating the inoperative status of the occupancy sensing system for the particular vehicle seat.

14. A method of determining an equivalent output value for a failed sensor having an output in a vehicle seat having a occupancy sensing system, said method including the steps of:
  sensing the output of each sensor in an array of sensors that detect a physical presence in the seat;
  classifying a sensor as inoperative when the output of the sensor is characterized as one from a group including a sensor output that falls below a predetermined value, exceeds a predetermined value, and remains fixed;
  determining which sensors are neighboring to the inoperative sensor within the array when a sensor is classified as inoperative;
  sensing the output of each neighboring sensor;
  retrieving a predetermined weight factor value for each neighboring sensor that represents the operative correlation between the inoperative sensor and the particular neighboring sensor from a stored database;
  determining the equivalent sensor output value for the inoperative sensor as an estimate based on the output of each neighboring sensor and the predetermined weight factor value for that particular neighboring sensor using an equation defined as:

$$\hat{X}_{kn} = \sum_{\substack{i=1 \\ i \neq k}}^{M} a_{ik} X_{in}$$

wherein where $\hat{X}_{kn}$ is the estimated equivalent sensor output value for the inoperative sensor (k) as a summation determined (n) number of times, $a_{ik}$ is the predetermined weight factor values associated with each neighborhood sensor (i) in regard to the inoperative sensor (k), and $X_{in}$ is the respective output of the neighborhood sensors (i) taken the same (n) number of times;
  applying the output values for each operable sensor in the array and the calculated equivalent output value for any inoperative sensor to a neural net;
  recognizing the applied sensor output values as one of a group of predetermined classification patterns that represent a physical presence in the seat defined by size, weight, and physical orientation; and
  continuously reinitiating the method to recognize the classification pattern.

15. A method as set forth in claim 14, wherein said step of classifying a sensor as inoperative when the output of the sensor falls below a predetermined value further includes the steps of:
  determining if the sensor is one that falls into a predetermined group of critical sensors such that an equivalent sensor output will not be calculated;
  classifying the occupancy sensing system for the particular vehicle seat as inoperative when more than two sensors have been classified as inoperative; and
  activating an operator warning device indicating the inoperative status of the occupancy sensing system for the particular vehicle seat.

16. A method as set forth in claim 14, wherein said step of classifying a sensor as inoperative when the output of the sensor exceeds a predetermined value further includes the steps of:
  determining if the sensor is one that falls into a predetermined group of critical sensors such that an equivalent sensor output will not be calculated;
  classifying the occupancy sensing system for the particular vehicle seat as inoperative when more than two sensors have been classified as inoperative; and
  activating an operator warning device indicating the inoperative status of the occupancy sensing system for the particular vehicle seat.

17. A method as set forth in claim 14, wherein said step of classifying a sensor as inoperative when the output of the sensor remains fixed further includes the steps of:
  determining if the sensor is one that falls into a predetermined group of critical sensors such that an equivalent sensor output will not be calculated;
  classifying the occupancy sensing system for the particular vehicle seat as inoperative when more than two sensors have been classified as inoperative; and
  activating an operator warning device indicating the inoperative status of the occupancy sensing system for the particular vehicle seat.

18. A method as set forth in claim 14, wherein the step of continuously reinitiating the method steps further includes the steps of:

determining if more than two sensors have been classified as inoperative;

classifying the occupancy sensing system for the particular vehicle seat as inoperative when more than two sensors have been classified as inoperative; and activating an operator warning device indicating the inoperative status of the occupancy sensing system for the particular vehicle seat.

* * * * *